United States Patent
Takeda et al.

(10) Patent No.: US 10,477,220 B1
(45) Date of Patent: Nov. 12, 2019

(54) OBJECT SEGMENTATION IN A SEQUENCE OF COLOR IMAGE FRAMES BASED ON ADAPTIVE FOREGROUND MASK UPSAMPLING

(71) Applicant: SONY CORPORATION, Tokyo (JP)

(72) Inventors: Hiroyuki Takeda, San Jose, CA (US); Mohammad Gharavi-Alkhansari, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/958,435

(22) Filed: Apr. 20, 2018

(51) Int. Cl.
| | |
|---|---|
| *H04N 19/132* | (2014.01) |
| *H04N 19/134* | (2014.01) |
| *H04N 19/142* | (2014.01) |
| *H04N 19/167* | (2014.01) |
| *G06T 7/11* | (2017.01) |
| *H04N 19/23* | (2014.01) |

(52) U.S. Cl.
CPC .............. *H04N 19/167* (2014.11); *G06T 7/11* (2017.01); *H04N 19/132* (2014.11); *H04N 19/23* (2014.11)

(58) Field of Classification Search
CPC . G06T 2207/10016; G06T 2207/30241; G06T 7/194; G06T 2207/10024; G06T 2207/30232; G06T 7/11; G06T 2207/30236; G06T 7/254; G06T 7/269; G06T 2207/20076; G06T 7/143; G06T 7/90; G06T 2207/10028
See application file for complete search history.

(56) References Cited

U.S. PATENT DOCUMENTS

| | | | |
|---|---|---|---|
| 8,170,350 B2 | 5/2012 | Steinberg et al. | |
| 8,452,087 B2* | 5/2013 | Sun ...................... | G06T 11/001 |
| | | | 382/162 |
| 8,565,520 B2 | 10/2013 | Williams et al. | |
| 9,129,377 B2 | 9/2015 | Ciurea et al. | |

(Continued)

FOREIGN PATENT DOCUMENTS

| | | |
|---|---|---|
| CN | 102651135 B | 6/2015 |
| WO | 2010/135809 A1 | 12/2010 |

OTHER PUBLICATIONS

International Search Report and Written Opinion of PCT Application No. PCT/IB2019/053140, dated Jul. 19, 2019, 12 pages of ISRWO.

*Primary Examiner* — Dave Czekaj
*Assistant Examiner* — Kehinde Abimbola
(74) *Attorney, Agent, or Firm* — Chip Law Group (57) ABSTRACT

An image processing apparatus includes a first type of sensor, a second type of sensor, and a control circuitry. The control circuitry receives a first foreground mask for an object-of-interest in a previous color image frame and further estimate a second foreground mask for the object-of-interest in a current color image frame at a first image resolution. The control circuitry further upsamples the second foreground mask to a second image resolution and select at least one region-of-interest in the current color image frame. The control circuitry then upscales the upsampled second foreground mask by an expectation parameter generated based on a kernel density-based estimation for the at least one pixel in a selected region-of-interest. The upscaled second foreground mask exhibits a minimum foreground mask error that is caused by upsampling with respect to the estimated second foreground mask.

22 Claims, 6 Drawing Sheets

(56) References Cited

U.S. PATENT DOCUMENTS

| | | | |
|---|---|---|---|
| 9,426,444 | B2 | 8/2016 | Guigues et al. |
| 9,547,908 | B1 | 1/2017 | Kim et al. |
| 2006/0285754 | A1 | 12/2006 | Steinberg et al. |
| 2010/0149371 | A1 | 6/2010 | Steinberg et al. |
| 2010/0302376 | A1 | 12/2010 | Boulanger et al. |
| 2011/0025859 | A1 | 2/2011 | Steinberg et al. |
| 2011/0075921 | A1* | 3/2011 | Sun ................ G06T 11/001 382/164 |
| 2011/0211749 | A1 | 9/2011 | Tan et al. |
| 2011/0242277 | A1 | 10/2011 | Do et al. |
| 2016/0321809 | A1* | 11/2016 | Chukka .............. G06K 9/0014 |
| 2017/0223234 | A1 | 8/2017 | Do et al. |
| 2017/0365100 | A1* | 12/2017 | Walton ................ G06T 19/006 |

* cited by examiner

OBJECT SEGMENTATION IN A SEQUENCE OF COLOR IMAGE FRAMES BASED ON ADAPTIVE FOREGROUND MASK UPSAMPLING

CROSS-REFERENCE TO RELATED APPLICATIONS/INCORPORATION BY REFERENCE

None.

FIELD

Various embodiments of the disclosure relate to image segmentation in video processing. More specifically, various embodiments of the disclosure relate to an image processing apparatus and method for object segmentation in a sequence of color image frames based on adaptive foreground mask upsampling.

BACKGROUND

Recent developments in the field of image processing have led to advancements in various image segmentation techniques. Such techniques facilitates segmentation of an object-of-interest (such as a human body or human face) from a specific image based on different statistical and/or probabilistic image feature-based methods. In one such approach, the object segmentation may be done based on estimation of a foreground mask of the object-of-interest from a specific image. The key to segment any object may lie in determining an appropriate boundary condition to classify pixels in estimated foreground mask as foreground pixels and background pixels.

Conventionally, in one solution, a pre-determined, completely static background (BG) image is subtracted from a captured image. The pre-determined static BG image may be generated in the beginning of the object segmentation process based on multiple sequential images of the background scene and by taking an average of such sequential images. The remaining pixels in the subtracted image are labeled as the foreground pixels. However, the foreground pixels may include erroneously determined foreground pixels. For example, at the time of generation of the pre-determined static BG image, moving objects (that includes the user) may be present in the scene or the camera may be displaced from an original position. Such errors may cause iterated generation of another static BG image. In another solution, depth information may be utilized to identify foreground pixels. However, the depth information may be unreliable for determination of foreground pixels as a result of noise present in most depth map sensors. Such noise may cause unevenness in the boundaries of the identified foreground regions obtained based on the depth information. Also, such noisy depth information may cause generation of undesired gaps or holes within the foreground regions.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An image processing apparatus and method for object segmentation in a sequence of color image frames based on adaptive foreground mask upsampling is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed image processing apparatus for object segmentation in a sequence of color image frames based on adaptive foreground mask upsampling. Exemplary aspects of the disclosure may include an image processing apparatus which may comprise a first type of sensor, a second type of sensor, and a control circuitry. The first type of sensor may be configured to capture a sequence of color image frames that may include a current color image frame and a previous color image frame. Initially, the control circuitry may be configured to receive a first foreground mask for an object-of-interest in the previous color image frame. Thereafter, the control circuitry may be configured to estimate a second foreground mask for an object-of-interest in the current color image frame at a first image resolution. The second foreground mask may be estimated based on the first foreground mask, and at least a shape of a portion of a human body in the current color image frame. The control circuitry may be further configured to upsample the estimated second foreground mask of the current color image frame from the first image resolution to a second image resolution. The upsampled second foreground mask may include at least one pixel with an unknown mask value. The control circuitry may be further configured to select at least one region-of-interest in the current color image frame, based on a spatial position of the at least the one pixel of the upsampled second foreground mask. The upsampled second foreground mask may be further upscaled by an expectation parameter generated based on a kernel density-based estimation for the at least one pixel in the selected at least one region-of-interest in the current color image frame. The upscaled second foreground mask may exhibit a minimum foreground mask error that may be caused by upsampling with respect to the estimated second foreground mask.

In accordance with an embodiment, the second type of sensor may be configured to capture depth information for the current color image frame and the previous color image frame. The second type of sensor may be further configured to capture a sequence of depth images for a scene captured in the sequence of color image frames. The sequence of color image frames and the sequence of depth images may be received from the first type of sensor and the second type of sensor, respectively.

In accordance with an embodiment, the control circuitry may be further configured to upsample the second foreground mask from the first image resolution to the second image resolution, based on a correspondence between a plurality of pixels in the second foreground mask and a plurality of pixels in the current color image frame. The first image resolution may be coarser than the second image resolution.

In accordance with an embodiment, the control circuitry may be further configured to estimate the expectation parameter for at least one pixel in the selected at least one region-of-interest. Such estimation of the expectation parameter may be based on a color component, a depth component, and a spatial position of each pixel of the selected at least one region-of-interest. Such estimation may be further based on a color component, a depth component, and a spatial position of a corresponding pixel of the first foreground mask of the previous color image frame. The expectation parameter may be estimated further based on a plurality of covariance parameters of a plurality of pixels of the selected at least one region-of-interest. The selected region-of-interest may include a set of foreground pixels and a set of background pixels. The control circuitry may be further configured to estimate a first set of covariance parameters of the selected region-of-interest, based on a color component, a depth component, and a spatial position of each pixel of the set of foreground pixels in the selected region-of-interest.

In accordance with an embodiment, the control circuitry may be further configured to estimate a second set of covariance parameters of the selected region-of-interest. Such estimation of the second set of covariance parameters may be done based on a color component, a depth component, and a spatial position of each pixel of the set of background pixels in the selected region-of-interest. The plurality of covariance parameters of the plurality of pixels of the selected at least one region-of-interest comprises the estimated first set of covariance parameters and the estimated second set of covariance parameters of the selected at least one region-of-interest.

In accordance with an embodiment, the control circuitry may be further configured to determine, as a first criteria, the estimated expectation parameter of the at least one pixel in the estimated second foreground mask to be greater than a threshold value. At least one pixel may be further classified as one of a foreground pixel and a background pixel, based on the determined first criteria.

In accordance with an embodiment, the control circuitry may be further configured to classify the current color image frame to a foreground region and a background region. The foreground region may be mapped to the estimated second foreground mask. The control circuitry may be further configured to extract an object-of-interest from the current color image frame, based on the upscaled second foreground mask of the current color image frame.

Figure 1:
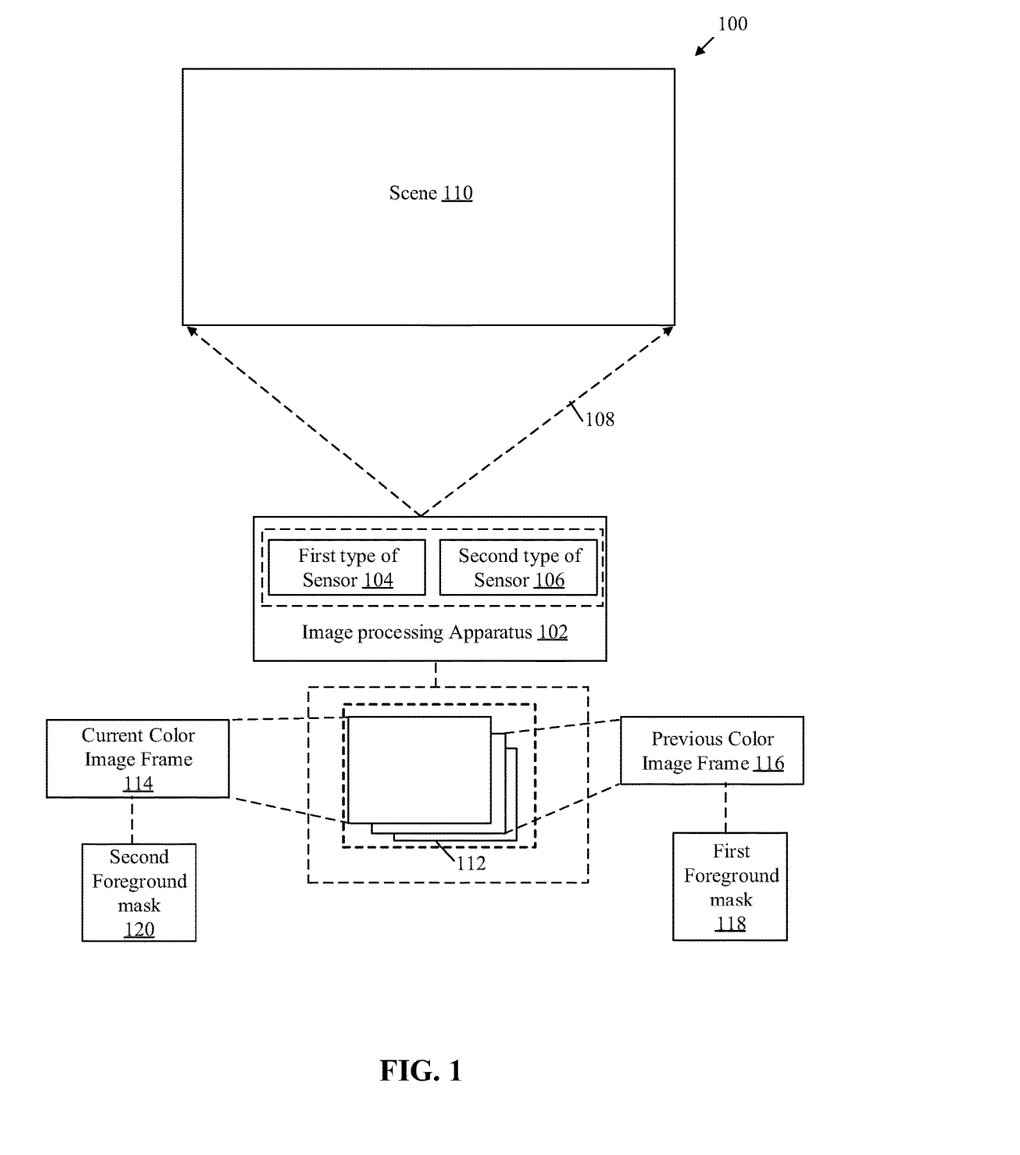
FIG. 1 is a block diagram that illustrates a network environment for an image processing apparatus for object segmentation in a sequence of color image frames based on adaptive foreground mask upsampling, in accordance with an embodiment of the disclosure.

FIG. 1 is a block diagram that illustrates a network environment for image processing for object segmentation in a sequence of color image frames based on adaptive foreground mask upsampling, in accordance with an embodiment of the disclosure. With reference to FIG. 1, there is shown a network environment 100. The network environment 100 may include an image processing apparatus 102. The image processing apparatus 102 may include a plurality of sensors (such as a first type of sensor 104, and a second type of sensor 106). In accordance with an embodiment, the first type of sensor 104 may be an image sensor and the second type of sensor 106 may be a depth sensor. The plurality of sensors may be configured to capture a plurality of color images and a plurality of depth images of a scene 110 in a field-of-view 108 of the image processing apparatus 102. The field-of-view 108 may include the scene 110 that includes an object-of-interest, for example a human and a plurality of other objects, for example, a computer, an animal, a table, a chair, and a tree.

The image processing apparatus 102 may comprise suitable logic, circuitry, and interfaces that may be configured to receive the plurality of color images and the plurality of depth images of the scene 110 from the first type of sensor 104 and the second type of sensor 106. The image processing apparatus 102 may be further configured to estimate a foreground mask of the object-of-interest in the plurality of color image frames. The functionalities of the image processing apparatus 102 may be implemented locally on a communication device, for example, a smartphone, a laptop, a tablet, a camera, and the like. Alternatively, the functionalities may be implemented remotely on a communication device, for example, an application server, a media server, or a special purpose graphical processing unit (GPU) enabled workstations. Examples of the image processing apparatus 102 may include, but are not limited to a digital camera, a digital camcorder, a camera phone, a smart phone, a portable music player, a gaming console, a tablet computer, a mobile device, a video player, a video disc writer/player. Other examples of the image processing apparatus 102 may include, but are not limited to a television, a home entertainment system, an augmented reality device, a virtual reality device, smart wearable device (for e.g. smart watch) or any other suitable computing device.

The first type of sensor 104 may be an image sensor. The first type of sensor 104 may comprise suitable logic, circuitry, and interfaces that may be configured to capture the plurality of color images from the scene 110. Examples of the plurality of color images may include, but is not limited to a Joint Photographers Expert Group (JPEG) image, a Tagged Image File Format (TIFF) image, or a raw image file. The first type of sensor 104 may have suitable optical instruments such as focusing lenses, which may focus on the scene 110 and/or a particular object-of-interest in the scene 110 on the first type of sensor 104. The first type of sensor 104 may comprise a viewfinder that may be configured to compose and/or focus on the scene 110 that may be captured by the first type of sensor 104. The first type of sensor 104 may be configured to store the captured plurality of images in a local buffer, a memory, and/or on a server. Examples of implementation of the first type of sensor 104 may include, but is not limited to a semiconductor charged coupled device (CCD) based image sensor, a Complementary metal-oxide-semiconductor (CMOS) based image sensor, an N-type metal-oxide-semiconductor based image sensor, a flat panel detector, or other image sensors.

The second type of sensor 106 may be a depth sensor. The second type of sensor 106 may comprise suitable logic, circuitry, and interfaces that may be configured to capture the plurality of depth images from the scene 110. Each of the plurality of depth images may include depth information associated with various objects in the scene 110 at various time instants at which the respective depth image may be captured by the second type of sensor 106. Examples of implementation of the second type of sensor 106 may include, but is not limited to a stereo triangulation based depth sensor, a structured light three dimensional (3D) scanner based depth sensor, or a coded aperture based depth sensor.

In some embodiments, the first type of sensor 104 and the second type of sensor 106 may be implemented on a network platform that may be peripheral to the image processing apparatus 102. In such cases, the first type of sensor 104 and the second type of sensor 106 may be communicatively coupled with the image processing apparatus 102 via various wired and wireless communication protocols. Examples of such wired and wireless communication protocols may include, but are not limited to at least one of a Transmission Control Protocol and Internet Protocol (TCP/IP), a Bluetooth protocol, User Datagram Protocol (UDP), Hypertext Transfer Protocol (HTTP), File Transfer Protocol (FTP), EDGE, IEEE 802.11, IEEE 802.11b, IEEE 802.11g, IEEE 802.11n, IEEE 802.11x and/or any other IEEE 802.11 protocol, multi-hop communication, wireless access point (AP), device to device communication, cellular communication protocols, or a combination or variants thereof.

In operation, the first type of sensor 104 may be configured to capture the sequence of color image frames 112 of the scene 110 in the field-of-view 108 of the first type of sensor 104. In some cases, the sequence of color image frames 112 may be a video, such as, a flash video, an audio video interleaved (AVI) video, and a moving pictures expert group (MPEG) video. The captured sequence of color image frames 112 may comprise a plurality of objects of the scene 110. The captured sequence of color image frames 112 may further comprise an object-of-interest. The object-of-interest may be an object which may be located at a same position but in a different orientation or position in the current color image frame 114 with respect to the previous color image frame 116 of the captured sequence of color image frames 112. In accordance with an embodiment, the sequence of color image frames 112 may include an object-of-interest to be segmented from the sequence of color image frames 112. The object-of-interest may be a moving object, a deforming object that changes its shape over a period of time, or an object located at a same position but in a different orientation at different time instances in the captured sequence of color image frames 112.

Examples of the object-of-interest may include, but are not limited to a human object, an animal, or a non-human or inanimate object, such as a vehicle or a sports item. The captured sequence of color image frames 112 may comprise a current color image frame 114 which may be captured by the first type of sensor 104 at a first time instant. The captured sequence of color image frames 112 may further comprise a previous color image frame 116 which may be captured by the first type of sensor 104 at a second time instant. Each of the sequence of color image frames 112 may comprise a plurality of pixels such that each of the plurality of pixels of a color image frame may include a color component and a spatial position in the color image frame. The first type of sensor 104 may be configured to transmit the sequence of color image frames 112 to the image processing apparatus 102.

The second type of sensor 106 may be configured to capture a depth image for each corresponding color image frame of the sequence of color image frames 112. The second type of sensor 106 may be configured to capture the depth image for each color image frame of the sequence of color image frames 112, concurrently with the capture of the respective color image frame by the first type of sensor 104. Alternatively stated, the second type of sensor 106 may be configured to capture a sequence of depth images from the scene 110. Each of the sequence of depth images may correspond to a different color image frame of the sequence of color image frames 112. The depth image of each color image frame of the sequence of color image frames 112 may include depth information associated with the scene 110 at a time instant when the respective color image frame is captured. Each of the sequence of depth images may include a plurality of pixels such that each of the plurality of pixels of a depth image may include a depth component and a spatial position in the depth image. The second type of sensor 106 may be configured to transmit the sequence of depth images to the image processing apparatus 102. The sequence of depth images may include a current depth image of the current color image frame 114.

The image processing apparatus 102 may be configured to receive the sequence of color image frames 112 and the sequence of depth images from the first type of sensor 104 and the second type of sensor 106, respectively. The image processing apparatus 102 may be configured to receive a first foreground mask 118 of the object-of-interest in the previous color image frame 116. In certain scenarios, the image processing apparatus 102 may be configured to receive the first foreground mask 118 from a server (not shown) via a communication network (not shown). In other scenarios, the image processing apparatus 102 may be configured to receive the first foreground mask 118 from a plurality of foreground masks which may be pre-stored in a memory (not shown) of the image processing apparatus 102. The received first foreground mask 118 of the object-of-interest of the previous color image frame 116 may correspond to the one or more objects, such as a human in the previous color image frame 116. The first foreground mask 118 may include a plurality of pixels such that each of the plurality of pixels of the first foreground mask 118 may include a color component, a depth component and a spatial position in the first foreground mask 118.

In accordance with an embodiment, the image processing apparatus 102 may be configured to estimate a second foreground mask 120 at a first image resolution for the object-of-interest in the current color image frame 114. The first image resolution may be coarser than an image resolution of the current color image frame 114. For example, if the image resolution of the current color image frame 114 is twelve megapixels, then the first image resolution for the second foreground mask 120 may be six megapixels, two megapixels, or one megapixel.

In contrast to the conventional and common approach of estimation of a foreground mask for the object-of-interest at the image resolution of the current color image frame 114, the image processing apparatus 102 may be configured to estimate the second foreground mask 120 at a coarser image resolution (such as the first image resolution). Advantageously, the image processing apparatus 102 may be required to process fewer number of image pixels in comparison with the conventional object segmentation methods that estimate the foreground mask at the image resolution of the current color image frame 114. The image processing apparatus 102 may be configured to estimate the second foreground mask 120 based on the received first foreground mask 118 and at least a shape of a portion of a human body in the current color image frame 114.

In certain scenarios, the image processing apparatus 102 may be configured to estimate the second foreground mask 120 based on the received first foreground mask 118 and the previous color image frame 116. For example, the image processing apparatus 102 may be configured to detect a movement and/or a direction of the movement of the object-of-interest in the current color image frame 114 with respect to the previous color image frame 116. The movement and/or the direction of the movement of the object-of-interest in the current color image frame 114, with respect to the previous color image frame 116 may be derived by using the mean-shift technique with the first foreground mask 118, on the previous color image frame 116 and the current color image frame 114. The image processing apparatus 102 may be configured to estimate the second foreground mask 120 based on detection of the movement and/or the direction of the movement of the object-of-interest in the current color image frame 114 with respect to the previous color image frame 116.

In other scenarios, the image processing apparatus 102 may be configured to estimate the second foreground mask 120 based on the detection of at least the shape of the portion of the human body in the current color image frame 114. For example, the image processing apparatus 102 may be configured to estimate the second foreground mask 120 based on a detection of a face, a human body, a human gesture, a shape, and/or an edge in the current color image frame 114. The image processing apparatus 102 may be configured to detect the face and/or the human body by use of a face recognition, and/or a human body recognition technique.

In accordance with an embodiment, the image processing apparatus 102 may be configured to classify the current color image frame 114 to a foreground region and a background region based on the estimated second foreground mask 120. The foreground region may comprise a plurality of foreground pixels and the background region may comprise a plurality of background pixels. The foreground region of the current color image frame 114 may be mapped to the estimated second foreground mask 120.

In accordance with an embodiment, the image processing apparatus 102 may be configured to upsample the estimated second foreground mask 120 from the first image resolution to a second image resolution. The second image resolution may be finer than the first image resolution. In certain scenarios, the second image resolution may be equal to the image resolution of the current color image frame 114. The image processing apparatus 102 may be configured to upsample the second foreground mask 120 from the first image resolution to the second image resolution based on an interpolation-based upsampling approach, such as a nearest neighbor interpolation approach.

In accordance with the nearest neighbor approach, the image processing apparatus 102 may be configured to upsample the second foreground mask 120, based on a correspondence between a plurality of pixels in the second foreground mask 120 and a plurality of pixels in the current color image frame 114. For example, the image processing apparatus 102 may be configured to estimate a mask value of each pixel of the upsampled second foreground mask 120 based on correspondence of a spatial position of each pixel of the upsampled second foreground mask 120 with each pixel of the current color image frame 114. However, the image processing apparatus 102 may fail to estimate a mask value of a first set of pixels of the upsampled second foreground mask 120. The first set of pixels of the upsampled second foreground mask 120 may have a plurality of unknown mask values. The upsampled second foreground mask 120 may include at least one pixel with an unknown mask value.

In cases where the image processing apparatus 102 erroneously estimates the second foreground mask 120 at the first image resolution, the estimated second foreground mask 120 may be noisy and may have a plurality of errors at the first image resolution. In such cases when image processing apparatus 102 upsamples the noisy and erroneous second foreground mask 120 to the second image resolution, the plurality of errors of the upsampled second foreground mask 120 may aggravate. The first set of pixels of the upsampled second foreground mask 120, which may have the plurality of unknown mask values, may be indicative of the plurality of errors of the upsampled second foreground mask 120.

In accordance with an embodiment, the image processing apparatus 102 may be further configured to select a region-of-interest in the current color image frame 114 based on at least one pixel with an unknown mask value from the upsampled second foreground mask 120. The region-of-interest may be selected further based on spatial correspondence of a pixel of the upsampled second foreground mask 120 with a pixel of the current color image frame 114. The selected region-of-interest of the current color image frame 114 may include at least one pixel associated with an unknown mask value from the upsampled second foreground mask 120 of the current color image frame 114. In certain scenarios, the selected region-of-interest may be centered on the at least one pixel of the current color image frame 114.

In accordance with an embodiment, the selected region-of-interest may include a first set of pixels of the current color image frame 114. The first set of pixels of the selected region-of-interest may include a set of foreground pixels and a set of background pixels. The set of foreground pixels may correspond to the foreground region of the current color image frame 114. The set of background pixels may correspond to the background region of the current color image frame 114. Each of the first set of pixels of the selected region-of-interest may include a color component, a depth component, and a spatial position in the selected region-of-interest. The image processing apparatus 102 may be configured to estimate a plurality of covariance parameters for each of the first set of pixels of the selected region-of-interest. Estimation of the plurality of covariance parameters of the first set of pixels is further explained in details, for example, in FIG. 2 and FIG. 4.

In accordance with an embodiment, the image processing apparatus 102 may be configured to estimate an expectation parameter for at least one pixel with an unknown mask value in the upsampled second foreground mask 120. The expectation parameter may indicate a probability that at least one pixel with the unknown mask value may be a foreground pixel. In cases where the at least one pixel may be the foreground pixel, the at least one pixel may have a mask value of "1". In cases where the at least first pixel may be a background pixel, at least the one pixel may have a mask value of "0".

The image processing apparatus 102 may be configured to estimate the expectation parameter for at least the one pixel of the second foreground mask 120.

Such an estimation of the expectation parameter may be done based on a kernel density-based estimation technique. The estimation of the expectation parameter may include factors that may be determined based on the color component, the depth component, and the spatial position of each pixel of the first set of pixels of the selected region-of-interest. The first set of pixels of the selected region-of-interest may spatially correspond to a first set of pixels of the first foreground mask 118 of the previous color image frame 116. The image processing apparatus 102 may be configured to estimate the expectation parameter based on a color component, a depth component, and a spatial position of each pixel of the first set of pixels of the first foreground mask 118 of the previous color image frame and the estimated plurality of covariance parameters of at least one pixel of the current color image frame 114. Estimation of the expectation parameter for at least one pixel of the upsampled second foreground mask is explained in detail, for example, in FIG. 2.

In accordance with an embodiment, the image processing apparatus 102 may be configured to determine a first criteria based on whether the expectation parameter of the at least one pixel in the upsampled second foreground mask 120 is greater than a threshold value. In certain scenarios, the threshold value may be a fractional numeral, such as "0.5". In cases where the estimated expectation parameter of the at least one first pixel is greater than the threshold value, the specific pixel in the first set of foreground pixels may be classified as the foreground pixel, based on the first criteria. In other cases where the estimated expectation parameter of at least one pixel is less than the threshold value, the specific pixel in the first set of foreground pixels may be classified as the background pixel, based on the first criteria.

In accordance with an embodiment, the image processing apparatus 102 may be further configured to upscale the upsampled second foreground mask by an expectation parameter. The expectation parameter may be generated based on the kernel density-based estimation for the at least one pixel in the selected at least one region-of-interest in the current color image frame. Advantageously, the upscaled second foreground mask may exhibit a minimum foreground mask error that may be caused by upsampling with respect to the estimated second foreground mask. The foreground mask error may be associated with a deviation in classification of different pixels in the current color image frame into pixels of a foreground mask and background region. Such deviation may be minimized in the upscaled second foreground mask with respect to the initially estimated second foreground mask and thereby compensation of errors caused by upsampling of the second foreground region. In cases where a pixel of the first set of foreground pixels is classified as the foreground pixel, the image processing apparatus 102 may upscale at least one pixel with a mask value of "1". In cases where a pixel of the first set of foreground pixels is classified as the background pixel, the image processing apparatus 102 may assign at least one pixel with a mask value of "0".

In accordance with an embodiment, the image processing apparatus 102 may be configured to extract the object-of-interest from the current color image frame 114 by using the upscaled second foreground mask 120 of the object-of-interest. In certain scenarios, the image processing apparatus 102 may be configured to extract the object-of-interest from the current color image frame 114 by background image subtraction.

In contrast with conventional approaches, the image processing apparatus 102 may be configured to upscale the upsampled second foreground mask 120 to reduce the plurality of errors which may be in the upsampled second foreground mask 120. The image processing apparatus 102 may comprise an error reduction capability to reduce the plurality of errors in the upsampled second foreground mask 120. Advantageously, the image processing apparatus 102 may be configured to extract the object-of-interest from the current color image frame 114 by using the upscaled second foreground mask 120, from which the plurality of errors may have been reduced by the image processing apparatus 102. Hence, the image processing apparatus 102 may be configured to extract the object-of-interest with more accuracy in comparison to the conventional object segmentation apparatus.

Figure 2:
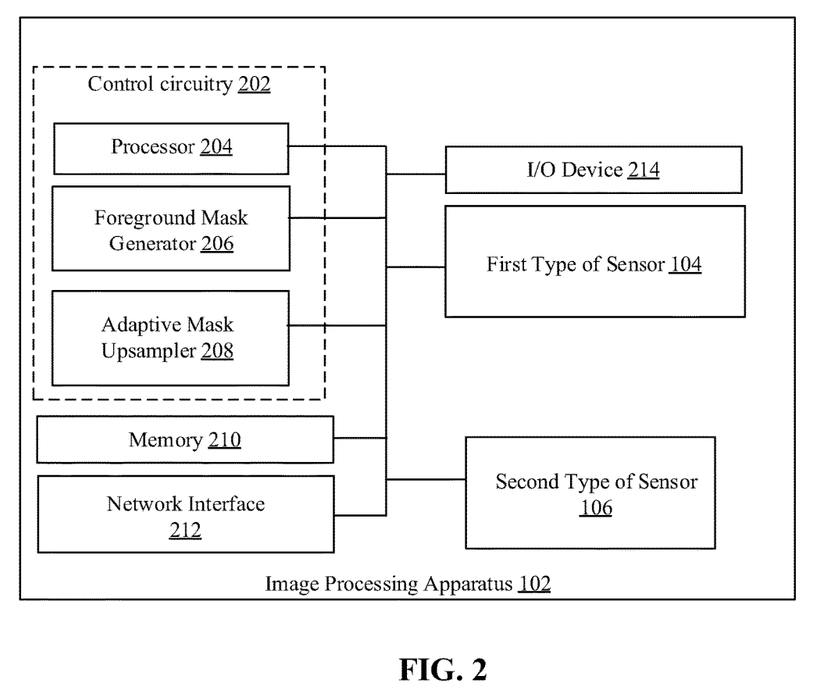
FIG. 2 is a block diagram that illustrates an exemplary image processing apparatus for object segmentation in a sequence of color image frames based on adaptive foreground mask upsampling, in accordance with an embodiment of the disclosure.

FIG. 2 is a block diagram that illustrates an exemplary image processing apparatus for object segmentation in a sequence of color image frames based on adaptive foreground mask upsampling, in accordance with an embodiment of the disclosure. FIG. 2 is explained in conjunction with elements from FIG. 1. With reference to FIG. 2, the image processing apparatus 102 may include a control circuitry 202. The control circuitry 202 may include a processor 204, and one or more specialized processing units, such as a foreground mask generator 206, and an adaptive mask upsampler 208. The image processing apparatus 102 may further include a memory 210, a network interface 212, and one or more input/output (I/O) devices, such as an I/O device 214. The image processing apparatus 102 may further include the first type of sensor 104 and the second type of sensor 106.

The processor 204 may comprise suitable logic, circuitry, and interfaces that may be configured to upscale the upsampled second foreground mask 120. The processor 204 may be further configured to estimate the expectation parameter of at least one pixel with the unknown mask value of the upsampled second foreground mask 120. The processor 204 may be communicatively coupled to the foreground mask generator 206, the adaptive mask upsampler 208, the memory 210, the network interface 212, and the I/O device 214. The processor 204 may be implemented based on a number of processor technologies known in the art. Examples of implementations of the processor 204 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The foreground mask generator 206 may comprise suitable logic, circuitry, and interfaces that may be configured to estimate the second foreground mask 120 of the object-of-interest in the current color image frame 114 at the first image resolution. The processor 204 may utilize the foreground mask generator 206 to estimate the second foreground mask 120 based on the received first foreground mask 118 and detection of the shape of the portion of the human body in the current color image frame 114 of the sequence of color image frames 112. Examples of implementations of the foreground mask generator 206 may be an x86-based processor, a GPU, a RISC processor, an ASIC processor, a CISC processor, a microcontroller, a CPU, and/or other control circuits.

The adaptive mask upsampler 208 may comprise suitable logic, circuitry, and interfaces that may be configured to upsample the estimated second foreground mask 120 from the first image resolution to the second image resolution. The processor 204 may utilize the adaptive mask upsampler 208 to upsample the estimated second foreground mask 120 from the first image resolution to the second image resolution, based on an interpolation technique (for example, Nearest Neighbor (NN)-based interpolation technique). Examples of implementations of the adaptive mask upsampler 208 may be an x86-based processor, a GPU, a RISC processor, an ASIC processor, a CISC processor, a microcontroller, a CPU, and/or other control circuits.

The memory 210 may comprise suitable logic, circuitry, and interfaces that may be configured to store a machine code and/or a set of instructions executable by the processor 204, the foreground mask generator 206, and the adaptive mask upsampler 208. The memory 210 may be configured to store the received sequence of color image frames 112 from the first type of sensor 104. The memory 210 may be further configured to store the received sequence of depth images from the second type of sensor 106. Examples of implementation of the memory 210 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 212 may comprise suitable logic, circuitry, and interfaces that may be configured to connect and communicate with a plurality of electronic devices, such as a computer, a smartphone, and a server. The network interface 212 may implement known technologies to support wired or wireless communication between different networked devices and/or circuits. The network interface 212 may include, but are not limited to an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 212 may communicate via offline and online wireless communication with networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), Bluetooth, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS).

The I/O device 214 may comprise suitable logic, circuitry, and interfaces that may be configured to receive an input from the one or more users. The I/O device 214 may be further configured to provide an output to the one or more users based on the received input, via the I/O device 214. The I/O device 214 may include various input and output devices that may be operable to communicate with the processor 204. Examples of the input devices may include, but are not limited to, a touch screen, physical input buttons, a joystick, a microphone, and/or a docking station. Examples of the output devices may include, but are not limited to, an-inbuilt display screen, a touch screen display, and/or a speaker.

In operation, a control signal may be received by the first type of sensor 104 and the second type of sensor 106, via at least one of the network interface 212 and the I/O device 214. The control signal may include instructions for the first type of sensor 104 to capture a sequence of color image frames that includes a current color image frame and a previous color image frame of a scene in the field-of-view of the first type of sensor 104. The control signal may further include instructions for the second type of sensor 106 to capture a plurality of depth images of the scene in field-of-view of the second type of sensor 106. The operation of the first type of sensor 104 may be synchronized with that of the second type of sensor 106 such that foreground information in the color image frames may correspond with depth information in the captured depth images.

The control signal may be further provided to the control circuitry 202, via a set of communication buses. The control circuitry may utilize the processor 204 to execute different instructions associated with extraction of foreground mask from the sequence of color image frames. The processor 204 may be configured to utilize the memory 210 to receive and store a first foreground mask for an object-of-interest in the previous color image frame captured in the sequence of color image frames by the first type of sensor 104. Thereafter, the processor 204 may be further configured to utilize the foreground mask generator 206 to estimate a second foreground mask for the object-of-interest in the current color image frame at a first image resolution. Such estimation may be done based on the first foreground mask, and at least a shape of a portion of a human body in the current color image frame.

Foreground Mask Upsampling:

The processor 204 may be further configured to upsample the estimated second foreground mask of the current color image frame from the first image resolution to a second image resolution. For example, an image resolution of the captured color image frame may be "1152 by 864 pixels". Similarly, the image resolution of the estimated second foreground mask may be "384 by 288 pixels" with a constant aspect ratio of "4:3". The upsampled second foreground mask may have an image resolution of "1152 by 864 pixels", i.e. the second foreground mask is upsampled by a factor of "3". In accordance with an embodiment, the estimated second foreground mask may be upsampled based on a statistical technique, such as a nearest neighbor-based interpolation technique.

The upsampled second foreground mask may further include at least one pixel with an unknown mask value. The estimation of the unknown mask value may be necessary for a precise estimation of the foreground region from the background region in each captured color image frame in the sequence of color image frames.

Foreground Mask Upscaling:

The processor 204 may utilize adaptive upscaling and smoothening methods to estimate unknown mask values, and precisely classify pixels associated with the unknown mask values into foreground pixels and background pixels. A deviation from the precise estimation may be further minimized by usage of statistical and other machine learning techniques that may provide critical decision boundaries to ascertain unknown mask values. Such techniques may be implemented on pixels identified within a region-of-interest in the current color image frame. Thus, the processor 204 may be configured to select at least one region-of-interest in the current color image frame, based on a spatial position of the at least one pixel of the upsampled second foreground mask. The unknown mask values for the at least one pixel in the selected at least one region-of-interest may be further done based on estimation of an expectation parameter.

In accordance with an embodiment, the processor 204 may be configured to estimate an expectation parameter for at least one pixel with the unknown masked values (of the second foreground mask 120). The expectation parameter may be estimated based on a kernel density estimation function that may be represented by "K". The kernel density estimation function "K" may be computed for the set of foreground pixels and the set of background pixels. The kernel density estimation function "K" for the set of foreground pixels may be represented as "$K_{CFG}$". The kernel density estimation function "K" for the set of foreground pixels may be represented as "$K_{CBG}$". The kernel density estimation function "$K_{CFG}$" for the set of foreground pixels may be represented by equation (1), as given:

$$K_{CFG}(X_j - X_i) = \frac{1}{\sqrt{(2\pi)^k |C_{FG}|}} \exp\left\{\frac{1}{2}(X_j - X_i)C^{-1}(X_j - X_i)\right\} \quad (1)$$

The kernel density estimation function "$K_{CFG}$" may be further utilized to estimate the expectation parameter for the upsampled second foreground mask. The expectation parameter for at least one pixel may be represented by "E{m}" where "m" may represent an index of a pixel in the region-of-interest. The expectation parameter "E{m}" may be further estimated based on a color component, a depth component, and a spatial position of each pixel of the selected at least one region-of-interest and a color component, a depth component, and a spatial position of a corresponding pixel of the first foreground mask 118 of the previous color image frame 116. The expectation parameter "E{m}" may be estimated further based on the estimated plurality of covariance parameters of the plurality of pixels of the selected at least one region-of-interest. The expectation parameter "E{m}" may be represented by equation (2), as given:

$$E\{m\} = \frac{\sum_{j \in FG} KC_{FG}(X_j - X_i)}{\sum_{j \in FG} KC_{FG}(X_j - X_i) + \sum_{j \in BG} KC_{BG}(X_j - X_i)} \quad (2)$$

Where, "$X_i$" corresponds to the color component, the depth component, and the spatial position of each pixel of the selected at least one region-of-interest;

"$X_j$" corresponds to the color component, the depth component, and the spatial position of each pixel of the first foreground mask 118, which corresponds to each pixel of the selected at least one region-of-interest; and "K" corresponds to a kernel density estimation function coefficient.

The first term "$X_i$" may indicate the color component, the depth component, and the spatial position of each pixel of the selected at least one region-of-interest. The respective pixel of the selected at least one region-of-interest may be represented by "i". The first term "$X_i$" may be represented by a first matrix comprising the color component, the depth component, and the spatial position of each pixel of the selected at least one region-of-interest. In the first matrix, a first term "$R_i$" may be indicative of a red color component of the respective pixel of the selected at least one region-of-interest. A second term "$B_i$" may be indicative of a blue color component of the respective pixel of the selected at least one region-of-interest. A third term "$G_i$" may be indicative of a green color component of the respective pixel of the selected at least one region-of-interest. A fourth term "$D_i$" may be indicative of a depth component of the respective pixel of the selected at least one region-of-interest. A fifth term "$x_i$" may be indicative of a spatial position (an "X" coordinate) of the respective pixel of the selected at least one region-of-interest. A sixth term "$y_i$" may be indicative of a spatial position (a "Y" coordinate) of the respective pixel of the selected at least one region-of-interest. The first term "$X_i$" may be a one dimensional matrix which may be represented by a mathematical equation (3), as given:

$$X_i = \begin{bmatrix} R_i \\ B_i \\ G_i \\ D_i \\ x_i \\ y_i \end{bmatrix} \quad (3)$$

The processor 204 may be configured to upscale the upsampled second foreground mask by the expectation parameter "E{m}" (as given by equation (2)) generated based on the kernel density-based estimation function "$K_{CFG}$" (as given by equation (1)) for the at least one pixel in the selected at least one region-of-interest in the current color image frame. The upscaled second foreground mask may exhibit a minimum foreground mask error that may be caused by upsampling with respect to the estimated second foreground mask. In accordance with an embodiment, the processor 204 may be configured to execute the upscaling operation a number of times to achieve a specific factor of upsampled second foreground mask, for example, a factor of "4" upsampling may be obtained from a factor of '2" upsampling based on double iteration of the upscaling operation on the upsampled foreground mask.

Foreground Mask Smoothening:

The upscaled foreground mask may be smoothened by a covariance matrix that may indicate variance of color pixel values in the selected region-of-interest. In accordance with an embodiment, the processor 204 may be further configured to estimate the first set of covariance parameters of the selected region-of-interest based on a color component, a depth component, and a spatial position of each pixel of the set of foreground pixels of the selected region-of-interest. In certain scenarios, the processor 204 may be further configured to compute a net variance of each of the color component, the depth component, and the spatial position of each of the set of foreground pixels in the selected region-of-interest. In such scenarios, the first set of covariance parameters may be computed based on the computed net variance.

In cases where the first set of covariance parameters is represented as a first covariance smoothing matrix "$C_{FG}$", the first covariance smoothing matrix "$C_{FG}$" may include a plurality of matrix elements. Examples of the plurality of matrix elements may include a red color variance parameter "$\sigma_R^2$", a blue color variance parameter "$\sigma_B^2$", a green color variance parameter "$\sigma_G^2$", a depth variance parameter "$\sigma_D^2$", an "X" coordinate variance parameter "$\sigma_x^2$", and a "Y" coordinate variance parameter "$\sigma_y^2$". The red color variance parameter "$\sigma_R^2$", the blue color variance parameter "$\sigma_B^2$", and the green color variance parameter "$\sigma_G^2$" may be indicative of a variance in the color components (such as a red color component, a blue color component and a green component) of the set of foreground pixels of the selected region-of-interest, throughout the selected region-of-interest. The depth variance parameter "$\sigma_D^2$" may be indicative of a variance in the depth component of the set of foreground pixels of the selected region-of-interest, throughout the selected region-of-interest. The "X" coordinate variance parameter "$\sigma_x^2$", and the "Y" coordinate variance parameter "$\sigma_y^2$" may be indicative of a variance in the spatial position of the set of foreground pixels of the selected region-of-interest. The first covariance smoothing matrix "$C_{FG}$" may be represented by equation (4), as given:

$$C_{FG} = \begin{bmatrix} \sigma_R^2 & . & . & . & . & . \\ . & \sigma_B^2 & . & . & . & . \\ . & . & \sigma_G^2 & . & . & . \\ . & . & . & \sigma_D^2 & . & . \\ . & . & . & . & \sigma_x^2 & . \\ . & . & . & . & . & \sigma_y^2 \end{bmatrix} \quad (4)$$

In accordance with an embodiment, the processor 204 may be configured to estimate the second set of covariance parameters of the selected region-of-interest based on a color component, a depth component, and a spatial position of each pixel of the set of background pixels of the selected region-of-interest. In certain scenarios, the processor 204 may be configured to compute a net variance of each of the color component, the depth component and the spatial position of each of the set of background pixels. In such scenarios, the second set of covariance parameters may be computed based on the computed net variance.

In cases where, the second set of covariance parameters is represented as a second covariance smoothing matrix "$C_{BG}$", the second covariance smoothing matrix "$C_{BG}$" may comprise a plurality of matrix elements. Examples of the plurality of matrix elements may comprise a red color variance parameter "$\sigma_R^2$", a blue color variance parameter "$\sigma_B^2$", a green color variance parameter "$\sigma_G^2$", a depth variance parameter "$\sigma_D^2$", an "X" coordinate variance parameter "$\sigma_x^2$", and a "Y" coordinate variance parameter $\sigma_y^2$. The red color variance parameter "$\sigma_R^2$", the blue color variance parameter "$\sigma_B^2$", and the green color variance parameter "$\sigma_G^2$" may be indicative of a variance in the color components (such as a red color component, a blue color component and a green component) of the set of background pixels of the selected region-of-interest, throughout the selected region-of-interest. The depth variance parameter "$\sigma_D^2$" may be indicative of a variance in the depth component of the set of background pixels of the selected region-of-interest, throughout the selected region-of-interest. The "X" coordinate variance parameter "$\sigma_x^2$", and the "Y" coordinate variance parameter "$\sigma_y^2$" may be indicative of a variance in the spatial position of the set of background pixels of the selected region-of-interest. The second covariance smoothing matrix "$C_{BG}$" may be represented with equation (5), as given:

$$C_{BG} = \begin{bmatrix} \sigma_R^2 & . & . & . & . & . \\ . & \sigma_B^2 & . & . & . & . \\ . & . & \sigma_G^2 & . & . & . \\ . & . & . & \sigma_D^2 & . & . \\ . & . & . & . & \sigma_x^2 & . \\ . & . & . & . & . & \sigma_y^2 \end{bmatrix} \quad (5)$$

The upscaled foreground mask may be smoothened by the first covariance smoothening matrix (as given by equation (4)) and the second covariance smoothening matrix (as given by equation (5)).

The functions and/or operations performed by the image processing apparatus 102, as described in FIG. 1, may be performed by the processor 204 and/or the adaptive mask upsampler 208. Other operations performed by the processor 204 and the adaptive mask upsampler 208 are further described in detail, for example, in the FIGS. 3A, and 3B.

Figure 3A:
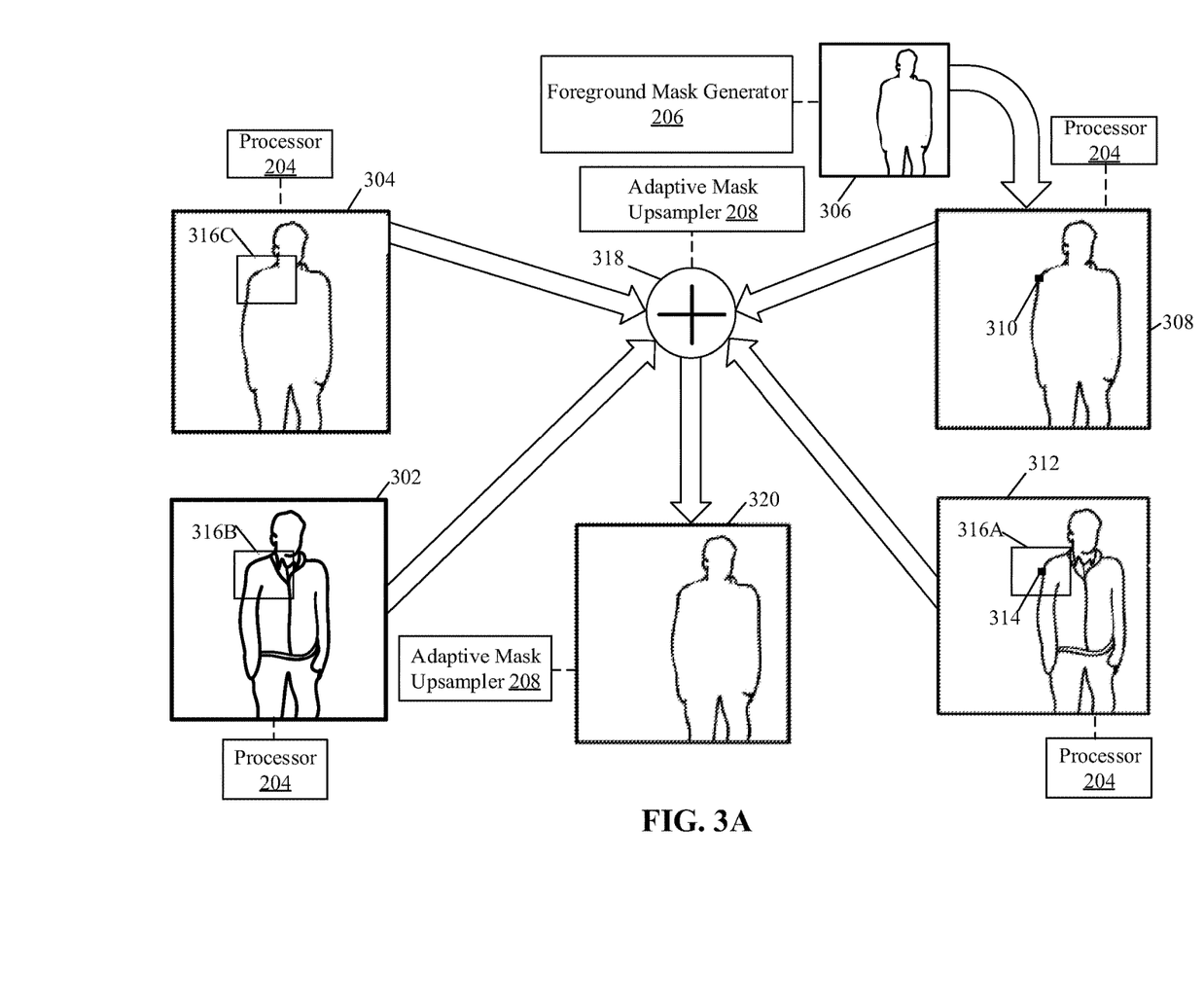
FIGS. 3A and 3B, collectively, illustrates exemplary operations of the image processing apparatus of FIG. 1 for object segmentation in a sequence of color image frames based on adaptive foreground mask upsampling, in accordance with an embodiment of the disclosure.

FIG. 3A illustrates exemplary operations of the image processing apparatus of FIG. 1 for object segmentation in a sequence of color image frames based on adaptive foreground mask upsampling, in accordance with an embodiment of the disclosure. FIG. 3A is explained in conjunction with elements from FIG. 1 and FIG. 2.

At 302, a previous color image frame (such as the previous color image frame 116 (FIG. 1)) may be received by the image processing apparatus 102. In certain scenarios, the processor 204 may be configured to receive the previous color image frame from a server (not shown) via a communication network (not shown) using the network interface 212. The processor 204 may be configured to receive a current color image frame (such as the current color image frame 114 (FIG. 1)) from the first type of sensor 104.

At 304, a first foreground mask (such as the first foreground mask 118 (FIG. 1)) of an object-of-interest in the previous color image frame may be received by the image processing apparatus 102. In certain scenarios, the processor 204 may be configured to receive the first foreground mask from the server (not shown) via the communication network (not shown) using the network interface 212. The received first foreground mask of the object-of-interest of the previous color image frame may correspond to one or more objects, such as a human and a toy in the previous color image frame.

At 306, a second foreground mask (such as the second foreground mask 120 (FIG. 1)) of the object-of-interest in the current color image frame may be estimated by the image processing apparatus 102. The processor 204 may utilize the foreground mask generator 206 to estimate the second foreground mask for the object-of-interest in the current color image frame at the first image resolution. The first image resolution may be coarser than the image resolution of the current color image frame.

At 308, the estimated second foreground mask may be upsampled from the first image resolution to a second image resolution. The processor 204 may be configured to upsample the estimated second foreground mask from the first image resolution to a second image resolution, as discussed in FIG. 1. The upsampled second foreground mask may include a plurality of errors, for example a first pixel 310 with an unknown mask value.

At 312, a first region-of-interest 316A may be selected in the current color image frame based on a correspondence between the first pixel 310 with an unknown mask value and a first pixel 314 of the current color image frame. The processor 204 may be configured to select the first region-of-interest 316A in the current color image frame based on the spatial correspondence between the first pixel 310 of the second foreground mask and the first pixel 314 of the current color image frame. The selected first region-of-interest 316A may correspond to a second region-of-interest 316B in the previous color image frame and a third region-of-interest 316C of the first foreground mask.

At 318, an expectation parameter may be estimated for the first pixel 310 of the second foreground mask. The processor 204 may utilize the adaptive mask upsampler 208 to estimate the expectation parameter based on a color component, a depth component, and a spatial position of each pixel of the selected first region-of-interest 316A and a color component, a depth component, and a spatial position of a corresponding pixel of the second region-of-interest 316B and/or the third region-of-interest 316C. The processor 204 may utilize the adaptive mask upsampler 208 to estimate the expectation parameter further based on a plurality of covariance parameters of a plurality of pixels of the selected first region-of-interest 316A. The processor 204 may utilize the adaptive mask upsampler 208 to classify the first pixel 310 as one of a foreground pixel and a background pixel based on the estimated expectation parameter.

At 320, the second foreground mask may be upscaled based on the estimated expectation parameter of the first pixel 310 of the second foreground mask. In cases where the first pixel 310 of the first set of foreground pixels is classified as the foreground pixel, the processor 204 may utilize the adaptive mask upsampler 208 to upscale at least the first pixel 310 with a mask value of "1". In cases where the first pixel of the first set of foreground pixels is classified as the background pixel, the processor 204 may utilize the adaptive mask upsampler 208 to assign at least the first pixel 310 with a mask value of "0".

Figure 3B:
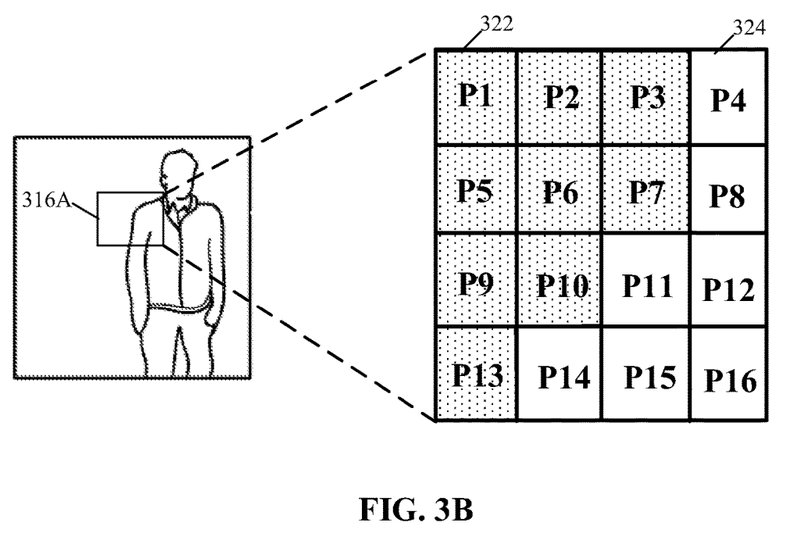

FIG. 3B illustrates a region of interest in a current color image frame, in accordance with an embodiment of the disclosure. FIG. 3B is explained in conjunction with elements from FIG. 1, FIG. 2, and FIG. 3A. With reference to FIG. 3B, there is shown the first region-of-interest 316A. The first region-of-interest 316A includes a plurality of pixels (such as a first pixel "P1", a second pixel "P2", a third pixel "P3", a fourth pixel "P4", a fifth pixel "P5", a sixth pixel "P6", a seventh pixel "P7", an eighth pixel "P8", a ninth pixel "P9", a tenth pixel "P10", an eleventh pixel "P11", a twelfth pixel "P12", a thirteenth pixel "P13", a fourteenth pixel "P14", a fifteenth pixel "P15", and a sixteenth pixel "P16"). The plurality of pixels may include a set of foreground pixels and a set of background pixels. The set of background pixels may include the first pixel "P1", the second pixel "P2", the third pixel "P3", the fifth pixel "P5", the sixth pixel "P6", the seventh pixel "P7", the ninth pixel "P9", the tenth pixel "P10", and the thirteenth pixel "P13". The set of foreground pixels may include the fourth pixel "P4", the eighth pixel "P8", the eleventh pixel "P11", the twelfth pixel "P12", the fourteenth pixel "P14", the fifteenth pixel "P15", and the sixteenth pixel "P16".

Figure 4A:
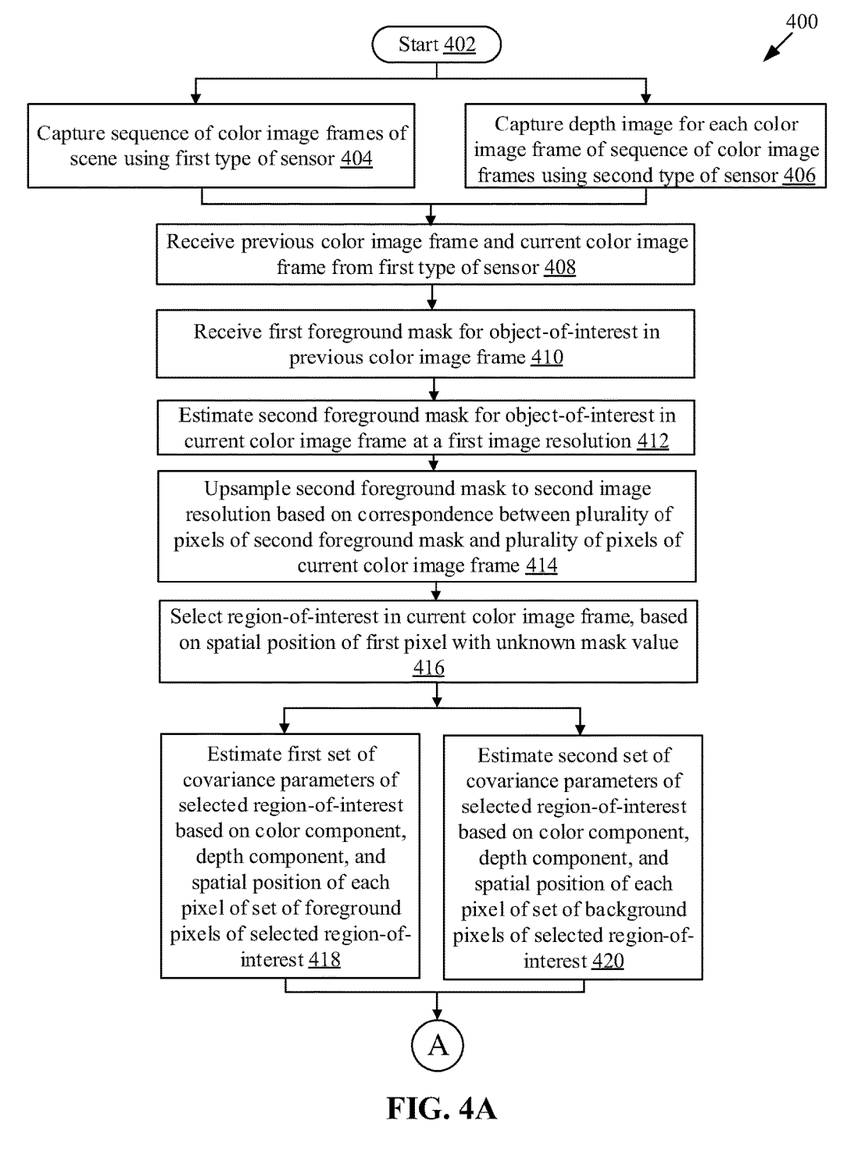
FIGS. 4A and 4B, collectively is a flowchart that illustrates an exemplary method for object segmentation in a sequence of color image frames based on adaptive foreground mask upsampling, in accordance with an embodiment of the disclosure.
Figure 4B:
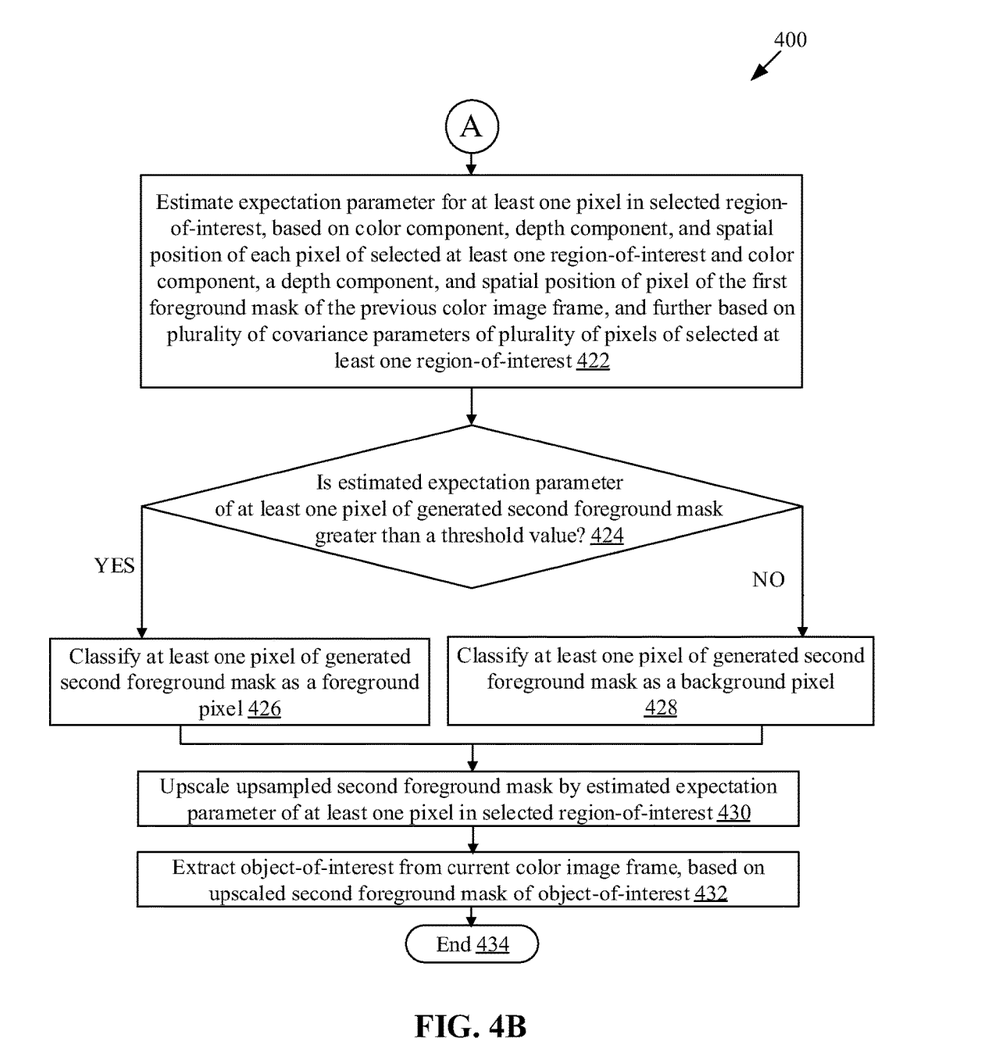

FIGS. 4A and 4B, collectively, depict a flow chart that illustrates an exemplary method object segmentation for object segmentation in a sequence of color image frames based on adaptive foreground mask upsampling, in accordance with an embodiment of the disclosure. With reference to FIG. 4A, there is shown a flow chart 400. The flow chart 400 is described in conjunction with FIGS. 1, 2, 3A, and 3B. The method starts at 402. A first operation (such as 404) may be executed concurrently with a second operation (such as 406) by way of parallel processing. Therefore, the control may concurrently pass to 404 and 406.

At 404, the sequence of color image frames 112 of the scene 110 may be captured. The first type of sensor 104 may be configured to capture the sequence of color image frames 112 from the scene 110. The sequence of color image frames 112 may be a video such as a flash video, an audio video interleaved (AVI) video, and a moving pictures expert group (MPEG) video, as discussed in FIG. 1. The captured sequence of color image frames 112 may comprise the plurality of objects of the scene 110.

At 406, a depth image for each corresponding color image frame of the sequence of color image frames 112 may be captured. The second type of sensor 106 may be configured to capture the depth image for each corresponding color image frame of the sequence of color image frames 112. The second type of sensor 106 may be configured to capture the depth image for each color image frame of the sequence of color image frames 112, concurrently with the capture of the respective color image frame by the first type of sensor 104.

At 408, the previous color image frame 116 and the current color image frame 114 may be received from the first type of sensor 104. The processor 204 may be configured to receive the previous color image frame 116 and the current color image frame 114 from the first type of sensor 104. Alternatively stated, the image processing apparatus 102 may be configured to receive the current color image frame 114 from the first type of sensor 104. The image processing apparatus 102 may be configured to receive the sequence of depth images from the second type of sensor 106.

At 410, a first foreground mask 118 of the object-of-interest in the previous color image frame 116 may be received. In certain scenarios, the image processing apparatus 102 may be configured to receive the first foreground mask 118 from a server (not shown) via a communication network (not shown). In other scenarios, the image processing apparatus 102 may be configured to receive the first foreground mask 118 from a plurality of foreground masks which may be stored in the memory 210 of the image processing apparatus 102. The received first foreground mask 118 of the object-of-interest of the previous color image frame 116 may correspond to the one or more objects, such as a human and a toy in the previous color image frame 116.

At 412, a second foreground mask 120 for the object-of-interest in the current color image frame 114 at a first image resolution may be estimated. The processor 204 may utilize the foreground mask generator 206 to estimate the second foreground mask 120 for the object-of-interest in the current color image frame 114 at the first image resolution. The first image resolution may be coarser than an image resolution of the current color image frame 114, as discussed in FIG. 1.

At 414, the second foreground mask 120 may be upsampled from the first image resolution to the second image resolution. The processor 204 may be configured to upsample the second foreground mask 120, based on a correspondence between a plurality of pixels of the second foreground mask 120 and a plurality of pixels of the current color image frame 114, as discussed in FIG. 1. The second foreground mask 120 may comprise at least the first pixel with an unknown mask value.

At 416, a region-of-interest of the current color image frame 114 may be selected. The processor 204 may be configured to select the region-of-interest in the current color image frame 114 based on at least the first pixel with the unknown mask value, of the upsampled second foreground mask 120. The processor 204 may be configured to select the region-of-interest based on spatial correspondence of a pixel of the upsampled second foreground mask 120 with a pixel of the current color image frame 114. The selected region-of-interest of the current color image frame 114 may include at least one pixel of the current color image frame 114. The region-of-interest may include the set of foreground pixels and the set of background pixels of the current color image frame 114. In certain scenarios, the selected region-of-interest may be centered on the first pixel of the current color image frame 114. A first operation (such as 418) may be executed concurrently with a second operation (such as 420) by way of parallel processing. Therefore, the control may concurrently pass to 418 and 420.

At 418, the first set of covariance parameters may be estimated for the selected region-of-interest. The processor 204 may be configured to estimate the first set of covariance parameters of the selected region-of-interest based on a color component, a depth component, and a spatial position of each pixel of the set of foreground pixels of the selected region-of-interest.

At 420, the second set of covariance parameters may be estimated for the selected region-of-interest. The processor 204 may be configured to estimate the second set of covariance parameters of the selected region-of-interest based on a color component, a depth component, and a spatial position of each pixel of the set of background pixels of the selected region-of-interest.

At 422, the expectation parameter may be estimated for at least the first pixel with the unknown mask value. The processor 204 may utilize the adaptive mask upsampler 208 to estimate the expectation parameter for at least one pixel of the second foreground mask 120, based on the color component, the depth component, and the spatial position of each pixel of the first set of pixels of the selected region-of-interest. The first set of pixels of the selected region-of-interest may spatially correspond to a first set of pixels of the first foreground mask 118 of the previous color image frame 116. The image processing apparatus 102 may be configured to estimate the expectation parameter further based on a color component, a depth component, and a spatial position of each pixel of the first set of pixels of the first foreground mask 118 of the previous color image frame 116 and the estimated plurality of covariance parameters of at least one pixel of the current color image frame 114.

At 424, it may be determined, as first criteria, if one pixel of the estimated second foreground mask 120 may be greater than the threshold value. In certain scenarios, the threshold value may be a fractional numeral, such as "0.5". In cases where the estimated expectation parameter of at least one pixel is greater than the threshold value, the control may pass to 426. In other cases where the estimated expectation parameter of at least one pixel is less than the threshold value, the control may pass to 428.

At 426, at least one pixel with the unknown mask value may be classified as a foreground pixel, based on the first criteria. The processor 204 may utilize the adaptive mask upsampler 208 to classify at least one pixel as the foreground pixel, based on the first criteria.

At 428, at least one pixel with the unknown mask value may be classified as a background pixel, based on the first criteria. The processor 204 may utilize the adaptive mask upsampler 208 to classify at least one pixel as the background pixel, based on the first criteria.

At 430, the upsampled second foreground mask 120 may be upscaled by the estimated expectation parameter of at least one pixel of the second foreground mask 120. The processor 204 may utilize the adaptive mask upsampler 208 to upscale the upsampled second foreground mask 120 of the object-of-interest by the estimated expectation parameter of at least one pixel of the upsampled second foreground mask 120. In cases where a pixel of the first set of foreground pixels is classified as the foreground pixel, the image processing apparatus 102 may upscale at least one pixel of the second foreground mask 120 with a mask value of "1". In cases where a pixel of the first set of foreground pixels is classified as the background pixel, the image processing apparatus 102 may upscale at least one pixel of the second foreground mask 120 with a mask value of "0".

At 432, the object-of-interest may be extracted from the current color image frame based on the upscaled and upsampled second foreground mask 120 of the object-of-interest. The processor 204 may utilize the adaptive mask upsampler 208 to extract the object-of-interest from the current color image frame 114 by using the upscaled second foreground mask 120 of the object-of-interest in the current color image frame 114. The control may pass to end 434.

In accordance with an embodiment, an image processing apparatus (such as the image processing apparatus 102 (FIG. 1) may include a first type of sensor (such as the first type of sensor 104 (FIG. 1)), a second type of sensor (such as the second type of sensor 106 (FIG. 1)), and a control circuitry (such as the control circuitry 202 (FIG. 2)). The first type of sensor 104 may be configured to capture a sequence of color image frames (for example, the sequence of color image frames 112 (FIG. 1)) comprising a current color image frame (for example, the current color image frame 114 (FIG. 1)) and a previous color image frame (for example, the previous color image frame 116 (FIG. 1)). The control circuitry 202 may be configured to receive a first foreground mask (for example, the first foreground mask 118 (FIG. 1)) for an object-of-interest in the previous color image frame 116. The control circuitry 202 may be configured to estimate a second foreground mask (for example, the second foreground mask 120 (FIG. 2)) for the object-of-interest in the current color image frame at a first image resolution, based on the first foreground mask 118, and at least a shape of a portion of a human body in the current color image frame 114.

In accordance with an embodiment, the control circuitry may be configured to upsample the second foreground mask to a second image resolution, based on a correspondence between a plurality of pixels of the second foreground mask and a plurality of pixels of the current color image frame. The upsampled second foreground mask comprises at least a first pixel with an unknown mask value. The control circuitry may be configured to select at least one region-of-interest in the current color image frame, based on a spatial position of at least one pixel of the upsampled second foreground mask. The control circuitry may be configured to estimate an expectation parameter for at least one pixel, based on a color component, a depth component, and a spatial position of each pixel of the selected at least one region-of-interest and a color component, a depth component, and a spatial position of a corresponding pixel of the first foreground mask of the previous color image frame, and further based on a plurality of covariance parameters of a plurality of pixels of the selected at least one region-of-interest. The control circuitry may be configured to upscale the upsampled second foreground mask, by the estimated expectation parameter of at least one pixel, to extract the object-of-interest from the current color image frame, based on the upsampled second foreground mask of the object-of-interest.

Various embodiments of the disclosure may provide a non-transitory computer readable medium and/or storage medium having stored thereon, a set of instructions executable by a machine and/or a computer to operate an image processing apparatus for object segmentation in a sequence of color image frames based on adaptive foreground mask upsampling. The set of instructions may cause the machine and/or the computer to perform steps that comprise capture of a sequence of color image frames comprising a current color image frame and a previous current color image frame by a first type of sensor. The operations may further comprise reception of a first foreground mask for an object-of-interest in the previous color image frame and estimation of a second foreground mask for the object-of-interest in the current color image frame at a first image resolution, based on the first foreground mask, and at least a shape of a portion of a human body in the current color image frame.

The operations may further comprise upsampling of the second foreground mask to a second image resolution, based on a correspondence between a plurality of pixels of the second foreground mask and a plurality of pixels of the current color image frame. At least one region-of-interest in the current color image frame may be selected based on a spatial position of at least one pixel of the upsampled second foreground mask. Further, an expectation parameter for at least one pixel may be estimated, based on a color component, a depth component, and a spatial position of each pixel of the selected at least one region-of-interest and a color component, a depth component, and a spatial position of a corresponding pixel of the first foreground mask of the previous color image frame, and further based on a plurality of covariance parameters of a plurality of pixels of the selected at least one region-of-interest. The upsampled second foreground mask may be upscaled by the estimated expectation parameter of at least one pixel, to extract the object-of-interest from the current color image frame, based on the upsampled second foreground mask of the object-of-interest.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which, when loaded in a computer system, is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without deviation from the scope of the present disclosure. In addition, many modifications may be made to adapt a particular situation or material to the teachings of the present disclosure without deviation from its scope. Therefore, it is intended that the present disclosure not be limited to the particular embodiment disclosed, but that the present disclosure will include all embodiments falling within the scope of the appended claims.

What is claimed is:

1. An image processing apparatus, comprising:
    a first type of sensor configured to capture a sequence of color image frames comprising a current color image frame and a previous current color image frame; and
    control circuitry configured to:
        receive a first foreground mask for an object-of-interest in the previous color image frame;
        estimate a second foreground mask for the object-of-interest in the current color image frame at a first image resolution, based on the first foreground mask, and at least a shape of a portion of a human body in the current color image frame;
        upsample the estimated second foreground mask of the current color image frame from the first image resolution to a second image resolution, wherein the upsampled second foreground mask comprises at least one pixel with an unknown mask value;
        select at least one region-of-interest in the current color image frame, based on a spatial position of the at least the one pixel of the upsampled second foreground mask; and
        upscale the upsampled second foreground mask by an expectation parameter generated based on a kernel density-based estimation for the at least one pixel in the selected at least one region-of-interest in the current color image frame, wherein the upscaled second foreground mask exhibits a minimum foreground mask error that is caused by the upsample with respect to the estimated second foreground mask.

2. The image processing apparatus according to claim 1, wherein the control circuitry is further configured to classify the current color image frame to a foreground region and a background region, and wherein the foreground region is mapped to the estimated second foreground mask.

3. The image processing apparatus according to claim 1, further comprising a second type of sensor configured to capture depth information for the current color image frame and the previous color image frame, and wherein the second type of sensor is further configured to capture a sequence of depth images for a scene captured in the sequence of color image frames.

4. The image processing apparatus according to claim 3, wherein the control circuitry is further configured to receive the sequence of color image frames from the first type of sensor and the sequence of depth images from the second type of sensor.

5. The image processing apparatus according to claim 1, wherein the control circuitry is further configured to upsample the second foreground mask from the first image resolution to the second image resolution, based on a correspondence between a plurality of pixels in the second foreground mask and a plurality of pixels in the current color image frame, and wherein the first image resolution is coarser than the second image resolution.

6. The image processing apparatus according to claim 1, wherein the control circuitry is further configured to estimate the expectation parameter for at least one pixel in the selected at least one region-of-interest, based on a color component, a depth component, and a spatial position of each pixel of the selected at least one region-of-interest, and a color component, a depth component, and a spatial position of a corresponding pixel of the first foreground mask of the previous color image frame, and wherein the expectation parameter is estimated further based on a plurality of covariance parameters of a plurality of pixels of the selected at least one region-of-interest.

7. The image processing apparatus according to claim 1, wherein the selected region-of-interest comprises a set of foreground pixels and a set of background pixels, and wherein the control circuitry is further configured to estimate a first set of covariance parameters of the selected region-of-interest, based on a color component, a depth component, and a spatial position of each pixel of the set of foreground pixels in the selected region-of-interest.

8. The image processing apparatus according to claim 7, wherein the control circuitry is further configured to estimate a second set of covariance parameters of the selected region-of-interest, based on a color component, a depth component, and a spatial position of each pixel of the set of background pixels in the selected region-of-interest.

9. The image processing apparatus according to claim 7, wherein the plurality of covariance parameters of the plurality of pixels of the selected at least one region-of-interest comprises the estimated first set of covariance parameters and the estimated second set of covariance parameters of the selected at least one region-of-interest.

10. The image processing apparatus according to claim 1, wherein the control circuitry is further configured determine, as a first criteria, the estimated expectation parameter of at least one pixel of the estimated second foreground mask to be greater than a threshold value.

11. The image processing apparatus according to claim 10, wherein the control circuitry is further configured to classify the at least one pixel as one of a foreground pixel and a background pixel, based on the first criteria.

12. The image processing apparatus according to claim 1, wherein the control circuitry is further configured to extract the object-of-interest from the current color image frame, based on the upscaled second foreground mask of the current color image frame.

13. A method, comprising:
in an image processing apparatus comprising a first type of sensor, a second type of sensor, and a control circuitry:
capturing, by the first type of sensor, a sequence of color image frames comprising a current color image frame and a previous current color image frame;
receiving, by the control circuitry, a first foreground mask for an object-of-interest in the previous color image frame;
estimating, by the control circuitry, a second foreground mask for the object-of-interest in the current color image frame at a first image resolution, based on the first foreground mask, and at least a shape of a portion of a human body in the current color image frame;
upsampling, by the control circuitry, the estimated second foreground mask of the current color image frame from the first image resolution to a second image resolution, wherein the upsampled second foreground mask comprises at least one pixel with an unknown mask value;
selecting, by the control circuitry, at least one region-of-interest in the current color image frame, based on a spatial position of the at least the one pixel of the upsampled second foreground mask; and
upscaling, by the control circuitry, the upsampled second foreground mask by an expectation parameter generated based on a kernel density-based estimation for the at least one pixel in the selected at least one region-of-interest in the current color image frame,
wherein the upscaled second Foreground mask exhibits a minimum foreground mask error that is caused by upsampling with respect to the estimated second foreground mask.

14. The method according to claim 13, further comprising classifying, by the control circuitry, the current color image frame to a foreground region and a background region, and wherein the foreground region is mapped to the estimated second foreground mask.

15. The method according to claim 13, further comprising capturing, by the second type of sensor, depth information for the current color image frame and the previous color image frame.

16. The method according to claim 13, further comprising capturing, by the second type of sensor, a sequence of depth images for a scene captured in the sequence of color image frames.

17. The method according to claim 13, further comprising upsampling, by the control circuitry, the second foreground mask from the first image resolution to the second image resolution, based on a correspondence between a plurality of pixels in the second foreground mask and a plurality of pixels in the current color image frame, and wherein the first image resolution is coarser than the second image resolution.

18. The method according to claim 13, further comprising estimating, by the control circuitry, the expectation parameter for at least one pixel in the selected at least one region-of-interest, based on a color component, a depth component, and a spatial position of each pixel of the selected at least one region-of-interest, and a color component, a depth component, and a spatial position of a corresponding pixel of the first foreground mask of the previous color image frame, and wherein the expectation parameter is estimated further based on a plurality of covariance parameters of a plurality of pixels of the selected at least one region-of-interest.

19. The method according to claim 13, further comprising estimating, by the control circuitry, a first set of covariance parameters of the selected at least one region-of-interest, based on a color component, a depth component, and a spatial position of each pixel of the set of foreground pixels in the selected region-of-interest, wherein the selected region-of-interest comprises a set of foreground pixels and a set of background pixels.

20. The method according to claim 13, further comprising determining, by the control circuitry, a first criteria based on whether the estimated expectation parameter of at least the one pixel of the estimated second foreground mask is greater than a threshold value.

21. The method according to claim 20, further comprising classifying, by the control circuitry, the at least one pixel as one of a foreground pixel and a background pixel, based on the first criteria.

22. The method according to claim 13, further comprising extracting, by the control circuitry, the object-of-interest from the current color image frame, based on the upscaled second foreground mask of the current color image frame.

* * * * *